Dec. 9, 1958 B. A. HARRIS 2,863,948
RELAY SELECTOR CIRCUIT
Filed April 19, 1957
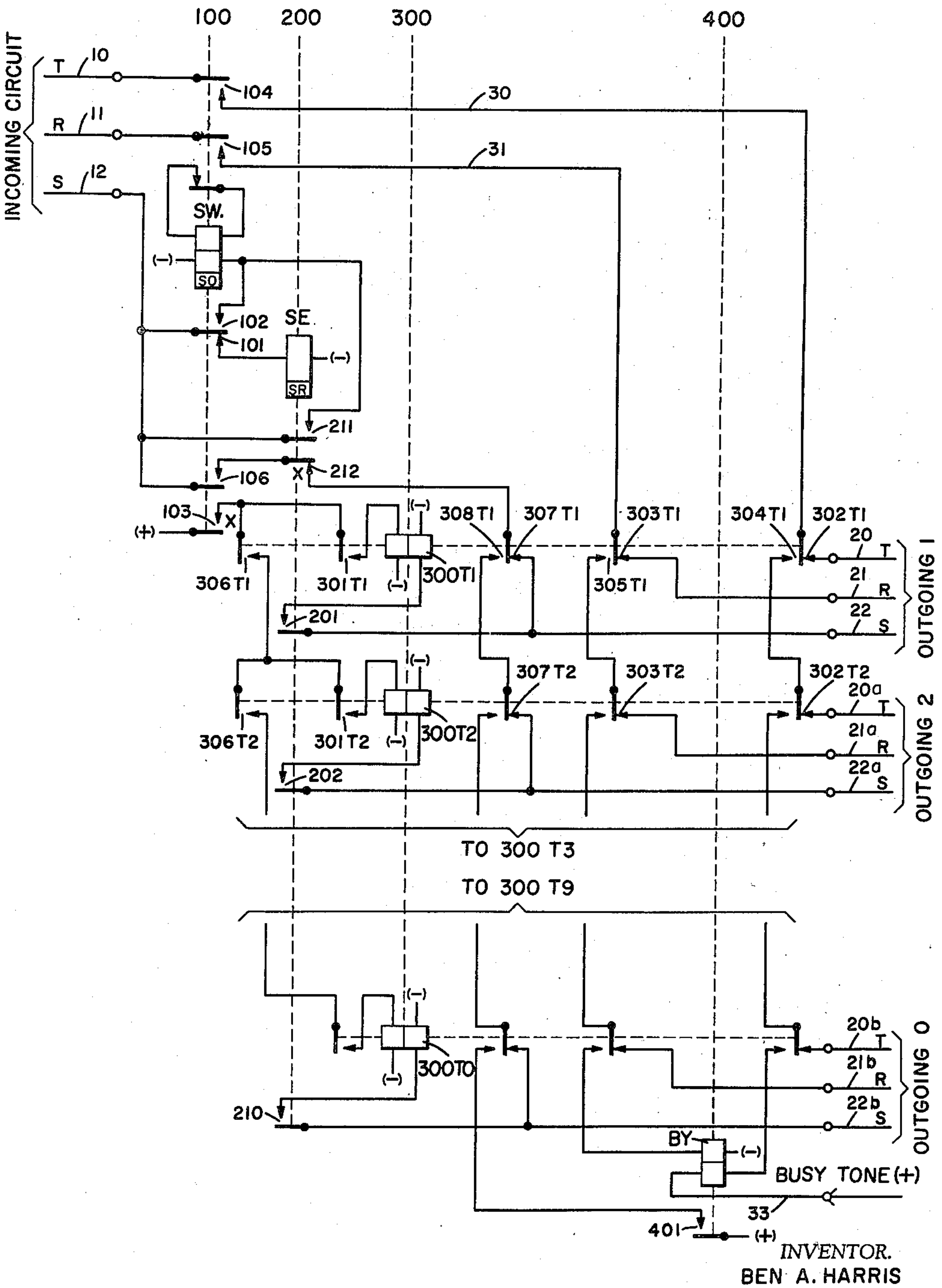
INVENTOR.
BEN A. HARRIS
BY Francis E. Blake
ATTORNEY

United States Patent Office 2,863,948

Patented Dec. 9, 1958

2,863,948

RELAY SELECTOR CIRCUIT

Ben A. Harris, Rochester, N. Y., assignor to General Dynamics Corporation, Rochester, N. Y., a corporation of Delaware Application April 19, 1957, Serial No. 653,941

4 Claims. (Cl. 179—18)

This invention relates to switching circuits and more particularly to connector circuits for automatically connecting an incoming circuit to an idle one of a plurality of outgoing circuits.

Communication circuits and telephone circuits in particular are sometimes provided with a plurality of outgoing circuit paths, any one of which may be used and connected to a single incoming circuit provided the outgoing circuit is not already in use or busy. In the past, so-called trunk hunting selectors or connectors have been used to find an idle one of a plurality of outgoing circuits for connection with the incoming circuit. These trunk hunting selectors or connectors have been relatively complex and complicated and are usually provided with a stepping switch and control circuit therefor.

It is a principal object of this invention to provide an improved and simplified connector circuit for automatically connecting an incoming circuit to an idle one of a plurality of outgoing circuits.

Another object of the invention is to provide a connector circuit as described in the foregoing object and which does not make use of stepping switches while using a minimum of relays to accomplish the desired switching.

Yet another object of the invention is to provide an improved connector circuit which will automatically connect and cut through an incoming circuit to an idle one of a plurality of outgoing circuits and will provide a busy identification signal if all outgoing circuits are busy.

Further objects, features, and the attending advantages of the invention will be apparent with reference to the following specification and drawing in which the sole figure is a schematic wiring diagram.

The subject invention will be described in connection with a particular application for use with telephone communication circuits and the conventional power supply for such circuits is a forty-eight volt battery (not shown) whose positive and negative terminals may be referred to as ground and battery, respectively, and are indicated by appropriate symbols at various places on the drawing. It should be understood, however, that this invention is not limited to the particular application for telephone communication circuits but may be used for switching any type of incoming circuit to an idle one of a plurality of outgoing circuits provided that the circuits are comprised of at least one utilization conductor and one busy guarding or circuit seizing conductor.

Referring to the drawing, an incoming circuit having tip and ring talking or utilization conductors 10 and 11, together with the busy guarding or sleeve conductor 12, is shown. The connector of this invention is to be described as being seized by the incoming circuit when a seizure potential of power supply ground (+) is applied to the sleeve lead 12. However, as will be apparent to anyone skilled in the art, a so-called CB relay (not shown) may be provided in place of the seizure relay 200 to be connected across the tip and ring conductors 10 and 11 and operated by closing a loop across the incoming conductors for thereby seizing the connector circuit.

A plurality of outgoing circuits such as outgoing 1; outgoing 2; — outgoing 0; having similar talking or utilization tip and ring conductors 20, 21; 20*a*, 21*a*; —20*b*, 21*b*; together with the respective busy guarding sleeve conductors 22, 22*a*, —22*b* are shown. The connector circuit of this invention is provided with transfer conductors similar to the utilization or talking conductors which are shown at 30 and 31 for interconnecting the incoming conductors 10 and 11 to idle pairs of outgoing conductors such as 20, 21; 20*a*, 21*a*; etc., when the connector circuit is operated in the manner to be described.

Each of the outgoing circuits, outgoing 1, outgoing 2, —outgoing 0, which may be of any suitable number corresponding to the number of outgoing circuits desired or available, are provided with an associated or respective transfer relay which may be individually identified as 300T1, 300T2 or 300T0. When the respective transfer relay 300T1, 300T2—300T0 is operated, the transfer conductors 30—31 are transferred in a chain circuit from the tip and ring conductors 20—21 of outgoing 1 circuit, for example, to the tip and ring conductors 20*a* and 21*a* of outgoing 2 circuit and when all of the transfer relays 300T1—300T0 are operated, the transfer conductors 30—31 extend in a chain circuit to the busy relay 400 for purposes to be later described.

When the connector circuit of the invention is seized by application of ground (+) to the sleeve conductor 12, the seizure relay 200, which is a slow release relay, is operated by the circuit traced from the negative terminal of the battery through the coil of relay SE and normally closed contacts 101 to the sleeve conductor 12 and the seizure potential thereon. The operation of relay 200 closes contacts 211 to extend the seizure potential on conductor 12 to the lower winding of the switch-through relay 100 and battery (—). The switch-through relay 100 is made slow to operate by the circuit connections for shunting its upper winding which form a conventional arrangement to those skilled in the art and when the switch-through relay 100 operates, contacts 101 will be opened and contacts 102 closed to cause the switch-through relay 100 to remain operated so long as the seizure potential is present on conductor 12 and at the same time cause the seizure relay 200, which is a slow release relay, to be slowly restored. While the seizure relay 200 is operated and the switch-through relay 100 is beginning to operate, seizure relay contacts 201, 202—210 corresponding to the number of outgoing circuits associated with the connector are closed to thereby connect the respective transfer relays 300T1, 300T2—300T0 to the respective sleeve conductors 22, 22*a*—22*b* of outgoing 1, outgoing 2 —outgoing 0 circuits. If the outgoing 1 circuit is busy, a busy guarding potential corresponding to station ground (+) will be present on the conductor 22 and through closed contact 201 will energize the right-hand winding of transfer relay 300T1 to cause it to operate and lock up from battery through its left-hand winding and operated contacts 301 to station ground through preliminarily closed contacts 103 of the switch-through relay 100 while the switch-through relay is operating or operated. Similarly, transfer relays 300T2—300T0 will operate if the associated outgoing circuits are marked busy by ground potential on the respective sleeve conductors 22*a*—22*b*.

The operation of transfer relay 300T1, for example, will open contacts 302T1 and 303T1 and close contacts 304T1 and 305T1 to extend the transfer conductors 30—31 in a chain circuit through normally closed contacts 302T2 and 303T2 to conductors 20*a* and 21*a* of the second outgoing circuit (outgoing 2). If the second outgoing circuit is also busy, the ground potential on its busy guarding sleeve conductor **22*a* will be extended through closed contacts 202 to operate relay 300T2 in the same manner as that described for transfer relay 300T1 except that transfer relay 300T2 now locks up through operated contacts 301T2 and 306T1 to the ground provided through preliminarily closed contacts 103. When relay 300T2 operates, contacts 306T2 are also closed to extend the holding circuit to the next transfer relay 300T3**, etc., should the next successive transfer relays be operated.

Assuming the outgoing 1 circuit to be busy and outgoing 2 circuit to be idle, transfer relay 300T1 will be operated and transfer relay 300T2 will not be operated. As soon as the slow operating switch-through relay 100 completes its operation, contacts 104 and 105 will be closed to extend the incoming tip and ring conductors 10 and 11 through transfer conductors 30 and 31, operated contacts 304T1 and 305T1 and normal contacts 302T2 and 303T2 to the outgoing tip and ring conductors **20*a* and 21*a* of the outgoing 2 circuit. At the same time that the switch-through relay 100 is fully operated, contacts 101 are opened to cause the seizure relay 200 to release slowly which thereupon recloses contacts 212 to extend a locking circuit through operated contacts 106, reclosed contacts 212, operated contacts 308T1 and normal contacts 307T2 to the sleeve conductor 22*a* of outgoing 2 circuit thus marking such circuit as busy and seizing subsequent equipment over the sleeve lead 22*a*, if desired. At the same time, previously closed contacts 201—210, which connected the transfer relays 300T1—300T0 to the busy guarding sleeve conductors of the respective outgoing circuits, are restored, thereby preventing any further operation of the transfer relays 300T1—300T0** while maintaining those previously operated transfer relays operated over their left-hand winding and the holding circuit previously described as extending thereto.

Considering, for example, that the outgoing 1 circuit had been idle, then the seizure and busy marking ground for the outgoing 1 sleeve conductor 22 would be extended through operated contacts 106, reclosed contacts 212 and normal contacts 307T1. It is believed that the operation of the respective transfer relays 300T1—300T0 and their associated contacts for providing the chain circuit connection of the transfer conductors 30—31 to the respective outgoing circuits in a manner to find and connect with an idle outgoing circuit should now be readily apparent to anyone skilled in the art without further detailed description for the remainder of the transfer relays and outgoing circuits.

In the event that all of the outgoing 1, outgoing 2, outgoing 0 circuits are busy and all of the respective transfer relays 300T1, 300T2—300T0 are operated, the transfer conductors 30 and 31 will be connected to the two windings of the busy relay 400 for application of a busy signaling tone over conductor 33. The busy relay 400 may operate by the station ground connected to the busy tone conductor 33 through the lower winding of relay 400 and the communication loop circuit to the station battery connected to the upper winding of the busy relay 400 as is conventional to those skilled in the art. Operated contacts 401 of the busy relay are closed to ground the connector sleeve conductor and additional contacts may be provided to be used to provide various recording and signaling functions such as peg count, all trunks busy (ATB), etc. (not shown), as will be obvious to anyone skilled in the art. In addition, the conventional busy tone signal as applied over conductor 33 and the corresponding operated contacts of the respective transfer relays to the talking conductors 10 and 11 will provide a desired audible indicating signal for the incoming communication circuit equipment.

So long as the incoming circuit is provided with seizure potential station ground (+) on the incoming sleeve conductor 12, the switch-through relay 100 will remain operated causing the previously operated transfer relays 300T1, etc., corresponding to the previously busy outgoing circuits, to remain operated thereby maintaining the connection of the talking conductors 10 and 11 of the incoming circuit to the previously first available idle outgoing circuit talking conductors and maintaining such first available outgoing circuit busy to all other connecting circuits by the extension of station ground through operated contacts of the switch-through relay 100 and closed contacts of the aforementioned operated transfer relays. When the incoming circuit desires to release the connector circuit of the invention, the seizure ground on the sleeve conductor 12 is removed thus causing the switch-through relay 100 to restore and all of the then operated transfer relays 300T1—300T0 to restore, thus restoring the connector circuit to the normal condition with all relays restored and transfer conductors 30 and 31 initially connected to the tip and ring conductors 20, 21 of the first or outgoing circuit 1.

Various modifications may be made within the spirit of the invention and the scope of the appended claims.

What is claimed is:

1. A connector for extending an incoming circuit to an idle one of a plurality of outgoing circuits wherein said incoming and outgoing circuits are each provided with at least one utilization conductor and also a busy guarding conductor to be marked with a potential when the respective circuit is seized or busy comprising, at least one transfer utilization conductor and transfer busy guarding conductor, seizure means to be operated in response to the application of seizure potential on the incoming circuit busy conductor, transfer means for each of said outgoing circuits, the operation of said seizure means effecting the connection of each of said transfer means to the busy guarding conductor of the respective outgoing circuit to cause each of said transfer means to be operated by the busy guarding potential on the busy guarding conductor of the respective outgoing circuit when busy, means responsive to the operation of each transfer means for extending said transfer utilization and busy conductors in a chain circuit from the utilization and busy conductors of the busy outgoing circuit to the utilization and busy conductors of the next successive outgoing circuit, switch-through means, means to operate said switch-through means in response to the operation of said seizure means for thereby connecting the utilization and busy guarding conductors of said incoming circuit to the transfer utilization and busy conductors, means responsive to the operation of said switch-through means for thereby maintaining said switch-through means operated by the seizure potential on the incoming circuit busy guarding conductor, means to restore said seizure means to its unoperated condition in response to the operation of said transfer means, and means also responsive to the operation of said switch-through means for maintaining the operation of the operated ones of said transfer means after said seizure means is restored to its unoperated condition.

2. A connector for extending an incoming circuit to an idle one of a plurality of outgoing circuits wherein said incoming and outgoing circuits are each provided with at least one utilization conductor and also a busy guarding conductor to be marked with a potential when the respective circuit is seized or busy comprising, at least one transfer utilization conductor and transfer busy guarding conductor, seizure means to be operated in response to the application of seizure potential on the incoming circuit busy conductor, transfer means for each of said outgoing circuits, the operation of said seizure means effecting the connection of each of said transfer means to the busy guarding conductor of the respective outgoing circuit to cause each of said transfer means to be operated by the busy guarding potential on the busy guarding conductor of the respective outgoing circuit when busy, means responsive to the operation of each transfer means for extending said transfer utilization and busy conductors in a chain circuit from the utilization and busy conductors of the busy outgoing circuit to the utilization and busy conductors of the next successive outgoing circuit, switch-through means, means to operate said switch-through means in response to the operation of said seizure means for thereby connecting the utilization and busy guarding conductors of said incoming circuit to the transfer utilization and busy conductors, means responsive to the operation of said switch-through means for thereby maintaining said switch-through means operated by the seizure potential on the incoming circuit busy guarding conductor, means to restore said seizure means to its unoperated condition in response to the operation of said transfer means, means also responsive to the operation of said switch-through means for maintaining the operation of the operated ones of said transfer means after said seizure means is restored to its unoperated condition, busy signal means and means to connect said signaling means to one of said transfer conductors in response to the operation of all of said transfer means.

3. A connector for extending an incoming circuit to an idle one of a plurality of outgoing circuits wherein said incoming and outgoing circuits are each provided with at least one utilization conductor and also a busy guarding conductor to be marked with a potential when the respective circuit is seized or busy comprising, at least one transfer utilization conductor and transfer busy guarding conductor, slow release seizure means to be operated in response to the application of seizure potential on the incoming circuit busy conductor, transfer means for each of said outgoing circuits, the operation of said seizure means effecting the connection of each of said transfer means to the busy guarding conductor of the respective outgoing circuit to cause each of said transfer means to be operated by the busy guarding potential on the busy guarding conductor of the respective outgoing circuit when busy, means responsive to the operation of each transfer means for extending said transfer utilization and busy conductors in a chain circuit from the utilization and busy conductors of the busy outgoing circuit to the utilization and busy conductors of the next successive outgoing circuit, slow operate switch-through means, means to operate said switch-through means in response to the operation of said seizure means for thereby connecting the utilization and busy guarding conductors of said incoming circuit to the transfer utilization and busy conductors, means responsive to the operation of said switch-through means for thereby maintaining said switch-through means operated by the seizure potential on the incoming circuit busy guarding conductors, means to restore said slow release seizure means to its unoperated condition in response to the operation of said transfer means, and means also responsive to the operation of said switch-through means for maintaining the operation of the operated ones of said transfer means after said seizure means is restored to its unoperated condition.

4. A connector for extending an incoming circuit to an idle one of a plurality of outgoing circuits wherein said incoming and outgoing circuits are each provided with at least one utilization conductor and also a busy guarding conductor to be marked with a potential when the respective circuit is seized or busy comprising, at least one transfer utilization conductor and transfer busy guarding conductor, slow release seizure means to be operated in response to the application of seizure potential on the incoming circuit busy conductor, transfer means for each of said outgoing circuits, the operation of said seizure means effecting the connection of each of said transfer means to the busy guarding conductor of the respective outgoing circuit to cause each of said transfer means to be operated by the busy guarding potential on the busy guarding conductor of the respective outgoing circuit when busy, means responsive to the operation of each transfer means for extending said transfer utilization and busy conductors in a chain circuit from the utilization and busy conductors of the busy outgoing circuit to the utilization and busy conductors of the next successive outgoing circuit, slow operate switch-through means, means to operate said switch-through means in response to the operation of said seizure means for thereby connecting the utilization and busy guarding conductors of said incoming circuit to the transfer utilization and busy conductors, means responsive to the operation of said switch-through means for thereby maintaining said switch-through means operated by the seizure potential on the incoming circuit busy guarding conductor, means to restore said slow release sizure means to its unoperated condition in response to the operation of said transfer means, means also responsive to the operation of said switch-through means for maintaining the operation of the operated ones of said transfer means after said seizure means is restored to its unoperated condition, busy signal means, and means to connect said signaling means to one of said transfer conductors in response to the operation of all of said transfer means.

References Cited in the file of this patent

UNITED STATES PATENTS

| | | |
|---|---|---|
| 2,232,371 | Dehn et al. | Feb. 18, 1941 |
| 2,767,247 | Lomax | Oct. 16, 1956 |